United States Patent [19]
Cockerham

[11] Patent Number: 5,810,274
[45] Date of Patent: Sep. 22, 1998

[54] APPARATUS FOR ATTACHING A COVER TO A FISHING REEL

[75] Inventor: Rayford A. Cockerham, Broken Arrow, Okla.

[73] Assignee: Zebco Division of Brunswick Corporation, Tulsa, Okla.

[21] Appl. No.: 845,597

[22] Filed: Apr. 25, 1997

[51] Int. Cl.⁶ .................................................. A01K 89/015
[52] U.S. Cl. .............................................................. 242/314
[58] Field of Search ................................... 242/312, 314, 242/315

[56] References Cited

U.S. PATENT DOCUMENTS

| | | | |
|---|---|---|---|
| 900,563 | 10/1908 | Matts | 242/314 |
| 5,108,042 | 4/1992 | Puyear et al. | 242/310 |
| 5,120,002 | 6/1992 | Kawai | 242/314 |
| 5,356,090 | 10/1994 | Sato | 242/314 |
| 5,370,331 | 12/1994 | Sato | 242/314 |
| 5,429,318 | 7/1995 | Sato | 242/314 |

*Primary Examiner*—Katherine Matecki
*Attorney, Agent, or Firm*—Fellers, Snider, Blankenship, Bailey & Tippens; Dennis D. Brown

[57] ABSTRACT

An apparatus for removably securing a cover on a fishing reel frame. The inventive apparatus comprises a locking member having a locking pin. The inventive apparatus also comprises an opening, provided by the frame, for receiving the locking pin to thereby secure the cover on the frame. The locking member is retained in the cover for reciprocating movement along a line of reciprocation. The apparatus further comprises an actuator, operable from outside of the cover, for moving the locking member along its line of reciprocation to thereby remove the locking pin from the frame opening.

13 Claims, 6 Drawing Sheets

APPARATUS FOR ATTACHING A COVER TO A FISHING REEL

FIELD OF THE INVENTION

The present invention relates to apparatuses for attaching covers to fishing reels. More particularly, but not by way of limitation, the present invention relates to apparatuses for attaching side covers to baitcast fishing reels.

BACKGROUND OF THE INVENTION

Baitcast fishing reels are well known in the art. A baitcasting reel will typically comprise: a split frame having a pair of opposing side plates; a foot extending from the frame for attaching the reel to a fishing rod; a line spool, rotatably positioned between the frame side plates, for retrieving and holding a fishing line; a spool shaft, on which the spool is secured, having ends extending through the frame side plates; a pinion gear provided on the spool shaft; a manually operable crank handle for rotating the spool in order to retrieve (i.e., wind) the fishing line; a gear train and crankshaft assembly mechanically linking the crank handle to the spool shaft pinion gear; a level-wind mechanism which transverses the spool during winding to ensure that the fishing line is evenly distributed along the length of the spool; an anti-reverse mechanism for preventing reverse rotation of the crank handle and spool; a clutch mechanism for disengaging the pinion gear from the spool shaft to allow the spool to rotate freely during casting; an exterior actuator (typically a thumb lever) for engaging the clutch; and a spool drag or spool braking mechanism.

In most cases, right and left side covers are removably attached to the frame side plates for housing the various reel operating mechanisms. A right-handed baitcasting reel (i.e., a reel designed for a right-handed user) will typically be structured such that: the spool drag or spool braking mechanism is housed under the left side cover; the crank handle is rotatably mounted outside of the right side cover; and the crankshaft, gear train, pinion gear, clutch, and anti-reverse mechanism are housed under the right side cover. Additionally, right-handed baitcasting reels are commonly configured to provide access to the reel spool by removing the left side cover. With the left cover removed, the spool can typically be removed and/or replaced through an aperture provided in the left side plate of the reel frame.

For sake of convenience, a right-handed perspective is used in describing the various reels and reel components discussed herein. As will be understood by those skilled in the art, a left-handed version of generally any baitcasting reel can be produced by simply reversing the arrangement of the reel's components such that the left-handed reel is a mirror image of the right-handed version of the reel.

As is apparent, it is very important that the left cover of the baitcasting reel be readily removable and reattachable to the frame side plate in order to provide easy access to the reel spool. Additionally, it is, in some cases, very important that the left cover be readily removable and reattachable in order to provide easy access to the spool drag or spool braking mechanism.

Spool drag or spool braking mechanisms are commonly used in baitcasting reels to alleviate line backlashing problems which can occur during casting. Because they utilize transversely oriented spools, baitcasting reels are more prone to backlashing problems than are spinning reels and spincasting reels. Such problems result primarily from the rotational momentum carried by the spool during casting. The most common types of drag/braking mechanisms used in baitcasting reels are magnetic drag systems and centrifugal braking systems.

The ability to quickly and easily remove and reattach the reel's left side cover is particularly important when the reel employs a centrifugal braking system. A centrifugal braking system will typically comprise: a plurality of rod-like members projecting radially from the left end of the spool shaft; a plurality of tubular braking pieces or weights slidably mounted on the rod-like members; and a brake ring encompassing the distal ends of the rod-like members. When the spool shaft rotates, the braking pieces move outwardly on the rod-like members into frictional contact with the brake ring. This frictional contact provides a braking force which slows the rotation of the reel.

Unfortunately, the amount of braking force generated by a centrifugal braking system must frequently be adjusted in order to account, for example, for the use of heavier or lighter lures. Typically, such adjustments are accomplished either by snapping some or all of the individual pieces into fixed, non-braking positions adjacent the spool shaft or by selectively replacing or removing the individual braking pieces. Such adjustments require that the left cover of the reel be removed to provide access to the braking assembly.

A commonly used approach for attaching a left side cover to a baitcasting reel is depicted in U.S. Pat. No. 5,108,042. U.S. Pat. No. 5,108,042 discloses the use of three bolt-like retainers which extend through both the right side-cover and the reel frame. The retainers have externally threaded distal ends which are received in threaded bores provided in the left cover. Two of the bolt-like members extend through spacer posts provided between the frame side plates. The third bolt-like retainer extends through a transverse line guide which forms part of the reel's level-wind mechanism. Each of the bolt-like members has a large, round head which projects from the right-side cover and has knurling around the exterior thereof. The knurled heads allow the bolt-like members to be turned by hand for removing and reattaching the left-side cover.

Bolt-type attachment systems have significant shortcomings. These systems are costly in that they require (a) a plurality of long, specially-adapted, bolt-like members and (b) the provision of special channels extending between the frame side plates for holding and shielding the bolt-like members. Additionally, when released from the left cover, the individual bolt-like members can fall out of the reel and can be easily lost. When removed from the reel, the thin, elongate bolt-like members can also be bent or otherwise damaged. Further, when the user's hands are wet and slippery, which is often the case when fishing, or when the user must also hold the fishing line, the bolt-like members can be difficult to manipulate. Moreover, the knurled bolt heads provided on the bolt-like members present obstructions on which the fishing line can easily become caught or entangled. Operation of the bolt-type system is also inconvenient and time consuming in that a plurality of bolt-like members must be manipulated and retained when removing and reattaching the left-side cover.

SUMMARY OF THE INVENTION

The present invention provides an apparatus for removably attaching a cover to a fishing reel frame. The inventive apparatus comprises a locking member having a locking pin. The inventive apparatus also comprises a receiving means, preferably provided by a frame plate, for receiving the locking pin to thereby secure the cover on the frame. The locking member is retained in the cover for reciprocating movement along a line of reciprocation. The apparatus further comprises actuating means, operable from outside of the cover, for moving the locking member along its line of reciprocation to thereby remove the locking pin from the receiving means.

The inventive apparatus satisfies the needs and resolves the problems mentioned above. The inventive apparatus allows the reel cover to be removed by simply pressing a button and then rotating the cover a few degrees with respect to the reel frame. The cover can then be reattached by simply placing the cover on the frame and rotating the cover a few degrees in the opposite direction. The inventive apparatus also eliminates the need for elongate bolts which can be easily dropped, lost, and/or damaged. All of the parts of the inventive apparatus are retained either on the reel frame or inside the reel cover. Additionally, the inventive attachment apparatus eliminates obstructions on which the fishing line can be caught or entangled.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Figure 1:
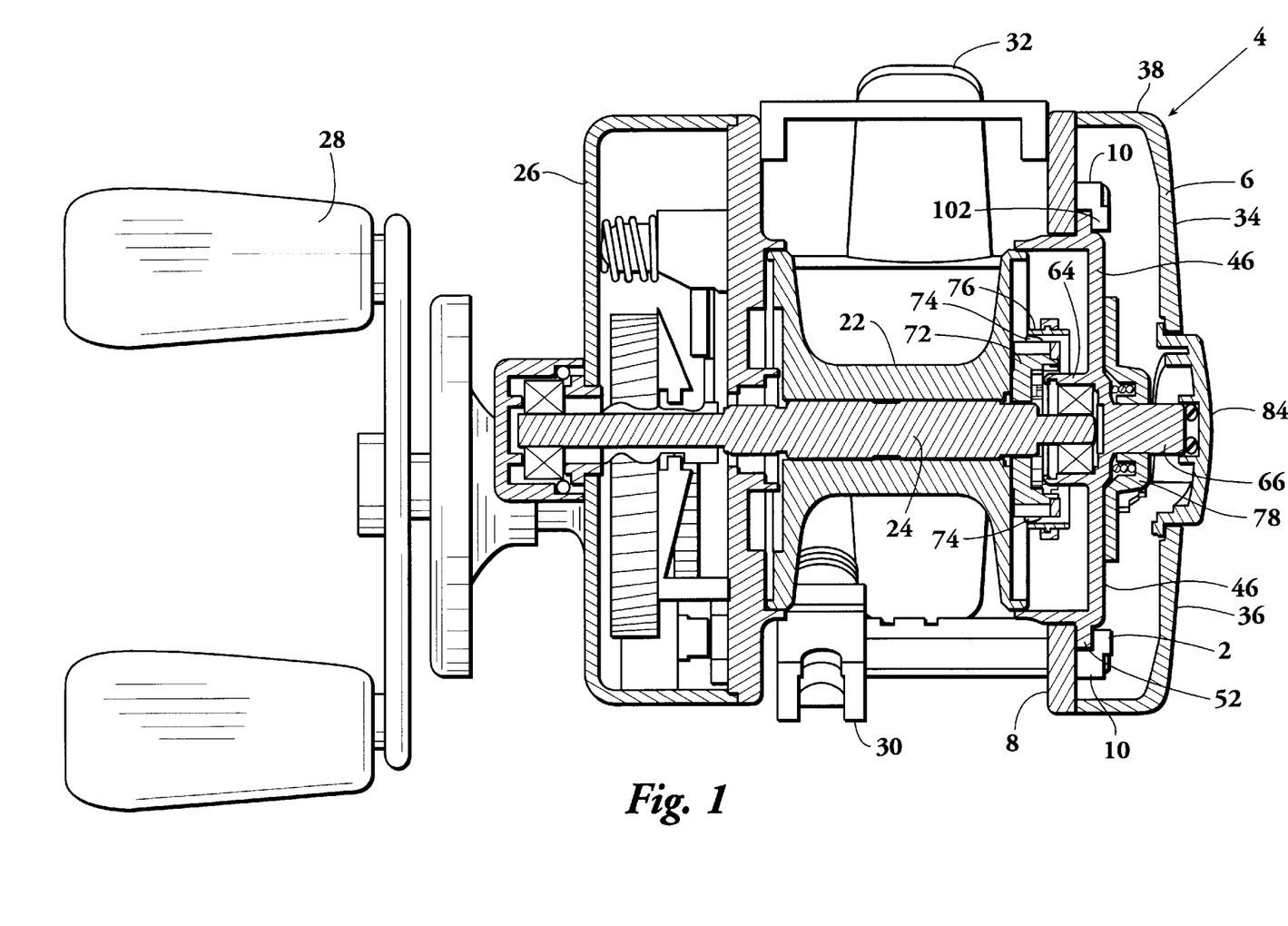
FIG. 1 provides a partially cutaway top view of a baitcasting reel 4 having an embodiment 2 of the inventive apparatus incorporated therein.
Figure 2:
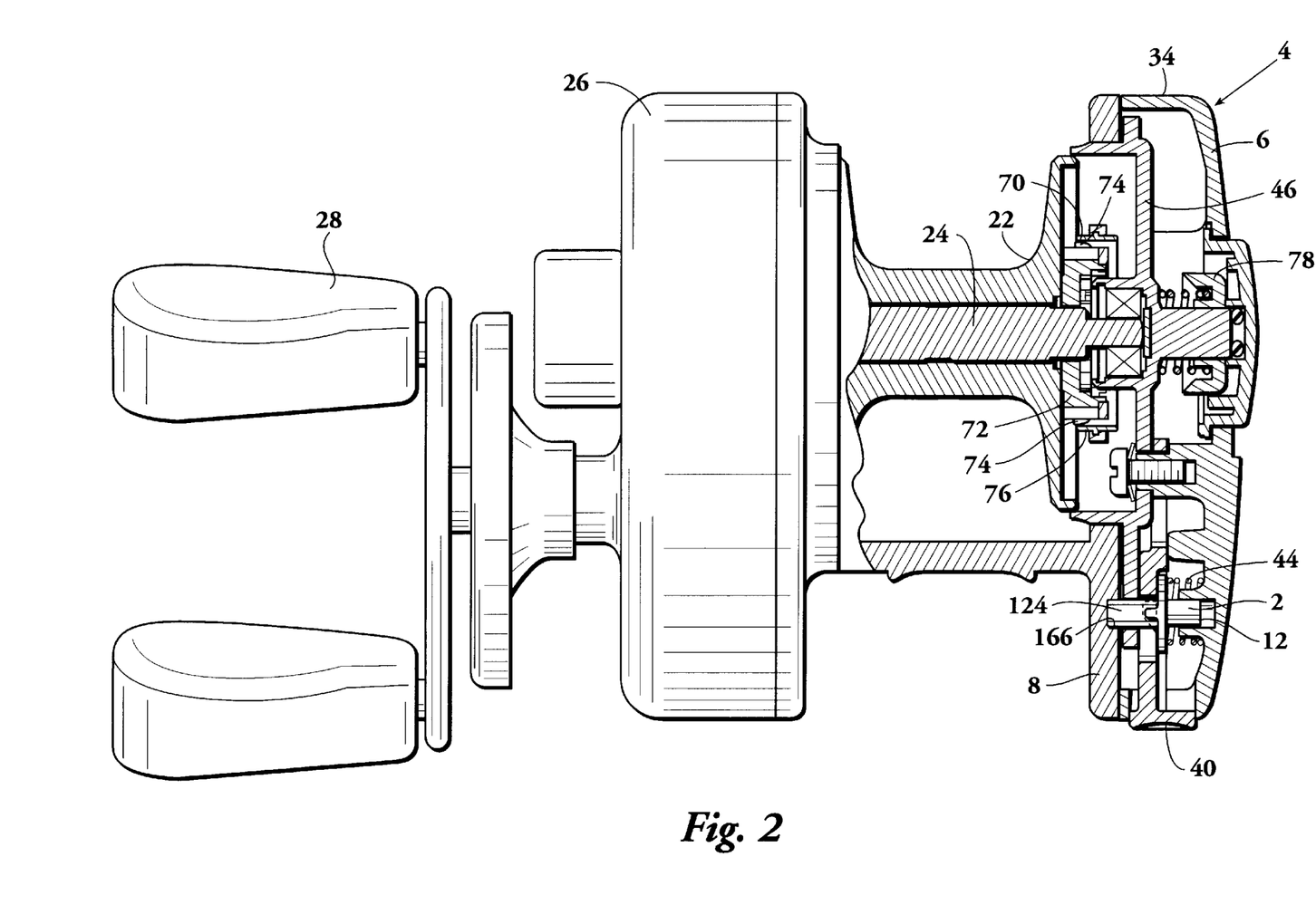
FIG. 2 provides a second partially cutaway view of baitcasting reel 4.

A baitcasting reel 4 incorporating an embodiment 2 of the inventive cover attaching apparatus is depicted in FIGS. 1 and 2. Baitcasting reel 4 also includes: a frame 8 having a right side plate 18 and a left side plate 20; a line spool 22 rotatably mounted between frame plates 18 and 20; an elongate spool shaft 24 extending longitudinally through spool 22; a right-side cover 26 removably attached over right plate 18 of frame 8; a crank handle 28 projecting from right cover 26; a level-wind mechanism 30 which traverses spool 22 during winding to ensure that the fishing line is evenly distributed along the length of spool 22; a foot structure 32, extending from frame 8, for attaching reel 4 to a fishing rod; and a left side cover 34 removably attachable over left end plate 20. Left cover 34 has a rounded end wall 36 and a substantially cylindrical side wall 38. Left cover 34 is removably attached to frame plate 20 by means of inventive attaching apparatus 2. When reel 4 is fully assembled, the only externally visible feature of inventive apparatus 2 is an actuating button 40 projecting from an aperture 42 formed in the side wall 38 of cover 34.

Although the reel 4 depicted in FIGS. 1 and 2 is a round, right-handed baitcasting reel, it will be understood by those skilled in the art that inventive apparatus 2 can be readily adapted for use in generally any type of right-handed or left-handed baitcasting reel.

Figures 3, 9, 10, 11, 12:
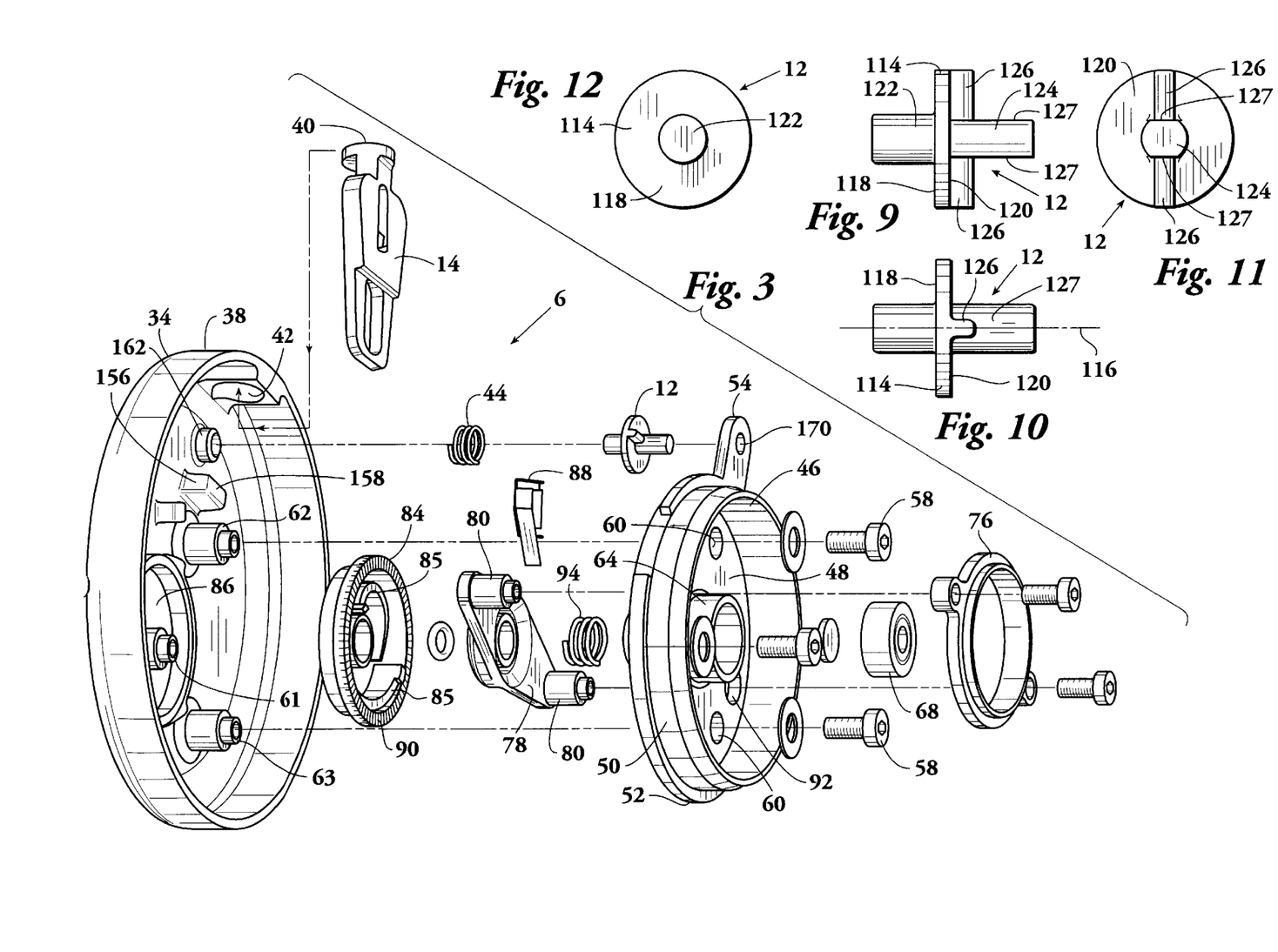
FIG. 3 provides an exploded, perspective view of the left side cover assembly 6 of baitcasting reel 4.
FIG. 9 provides an elevational side view of a locking post 12 used in inventive apparatus 2.
FIG. 10 provides another elevational side view of locking post 12.
FIG. 11 provides an elevational rearward end view of locking post 12.
FIG. 12 provides an elevational forward end view of locking post 12.
Figure 4:
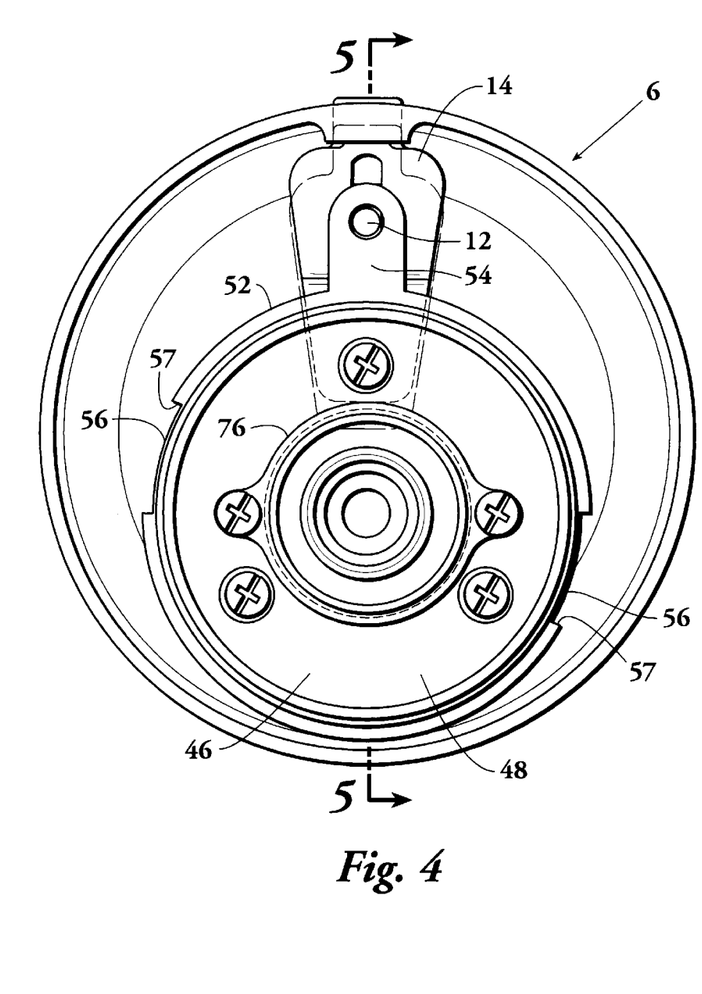
FIG. 4 provides an elevational rear view of side cover assembly 6.
Figure 5:
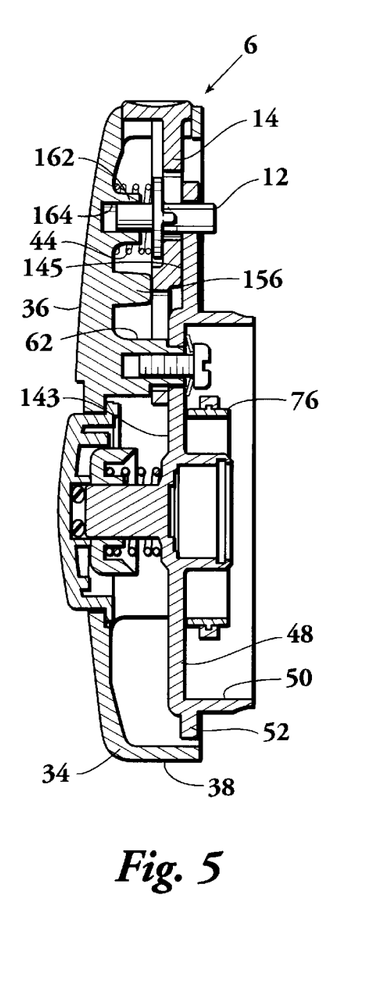
FIG. 5 provides a cutaway, elevational side view of side cover assembly 6 as seen from perspective 5—5 shown in FIG. 4.
Figure 6:
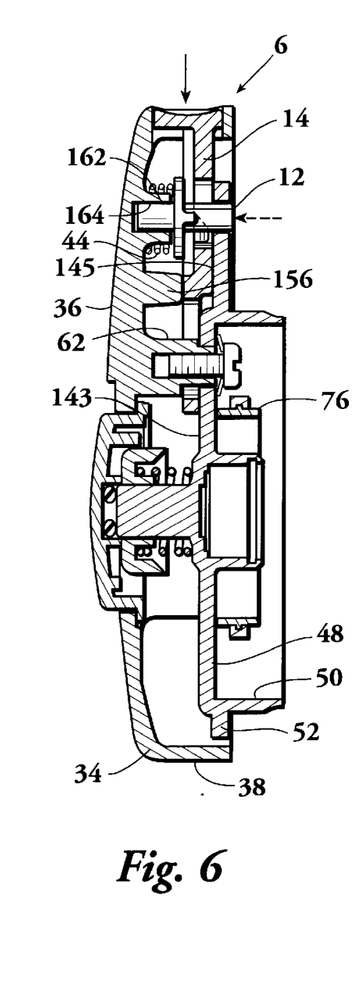
FIG. 6 provides a second cutaway, elevational side view of side cover assembly 6.

Inventive apparatus 2 comprises: a pair of flange-retaining members 10 secured to the flat exterior surface 21 of frame plate 20; a locking post 12; an actuating member 14; and a spring 44. Locking post 12, actuating member 14, and spring 44 are operably retained within left cover 34 by a spool-retaining piece 46. Left cover 34 also houses a spool braking assembly 70.

Spool retainer 46 comprises: a substantially circular retaining plate 48; a substantially cylindrical wall 50 projecting rearwardly from plate 48; an exterior flange 52 projecting radially outward from outer wall 50; and a flat, radial ear 54 projecting outwardly from exterior flange 52. A pair of notches 56 are provided in exterior flange 52 for operably receiving flange-retaining members 10. Spool retainer 46 is secured to the interior of left cover 34 by means of bolts 58. Bolts 58 extend through apertures 60 provided in circular retaining plate 48 and are received in threaded bosses 61, 62, and 63 formed in the interior of cover 34. Spool retainer 46 further comprises a cylindrical bearing cup 64 projecting rearwardly from retaining plate 48 and a brake assembly guide post 66 extending forwardly from retaining plate 48. Bearing cup 64 holds a spool shaft bearing 68.

As used herein, the terms "forward" and "forwardly facing" describe features facing and/or positioned away from exterior surface 21 of the left plate 20 of frame 8. The terms "rearward" and "rearwardly facing" describe features facing and/or positioned toward exterior surface 21 of plate 20.

As will be apparent to those skilled in the art, the general structure and operation of inventive apparatus 2 will remain substantially the same regardless of the type of spool drag or spool braking apparatus employed in the reel. The particular braking assembly 70 used in reel 4 is an adjustable, centrifugal braking apparatus comprising: a brake pad housing 72 press fit onto spool shaft 24 whereby housing 72 rotates with shaft 24 during casting; a plurality of brake pads 74 which slide radially outward in response to the rotation of housing 72; a brake ring 76 selectively positionable around housing 72 such that, during casting, some or all of brake pads 74 will contact ring 76; a cam slider 78 having rearwardly projecting, threaded bosses 80 to which brake ring 76 is attached; a brake adjustment dial 84 projecting through an aperture 86 provided in cover 34; and a clicker spring 88, secured in cover 34, for providing an audible indication of dial movement by interacting with serrations 90 provided on dial 84. Cam bosses 80 are slidably received through apertures 92 provided in retaining plate 48. Thus, cam slider 78 and brake ring 76 can be moved axially for adjusting the amount of braking force generated by braking assembly 70. Cam ramps 85 are provided in dial 84 and corresponding cam ramps are provided on cam slider 78 such that the axial positions of cam slider 78 and brake ring 76 can be selectively adjusted by turning dial 84. A biasing spring 94 provided between cam slider 78 and spool retainer 46 holds these cam ramps in operative engagement.

Figures 7, 8, 19:
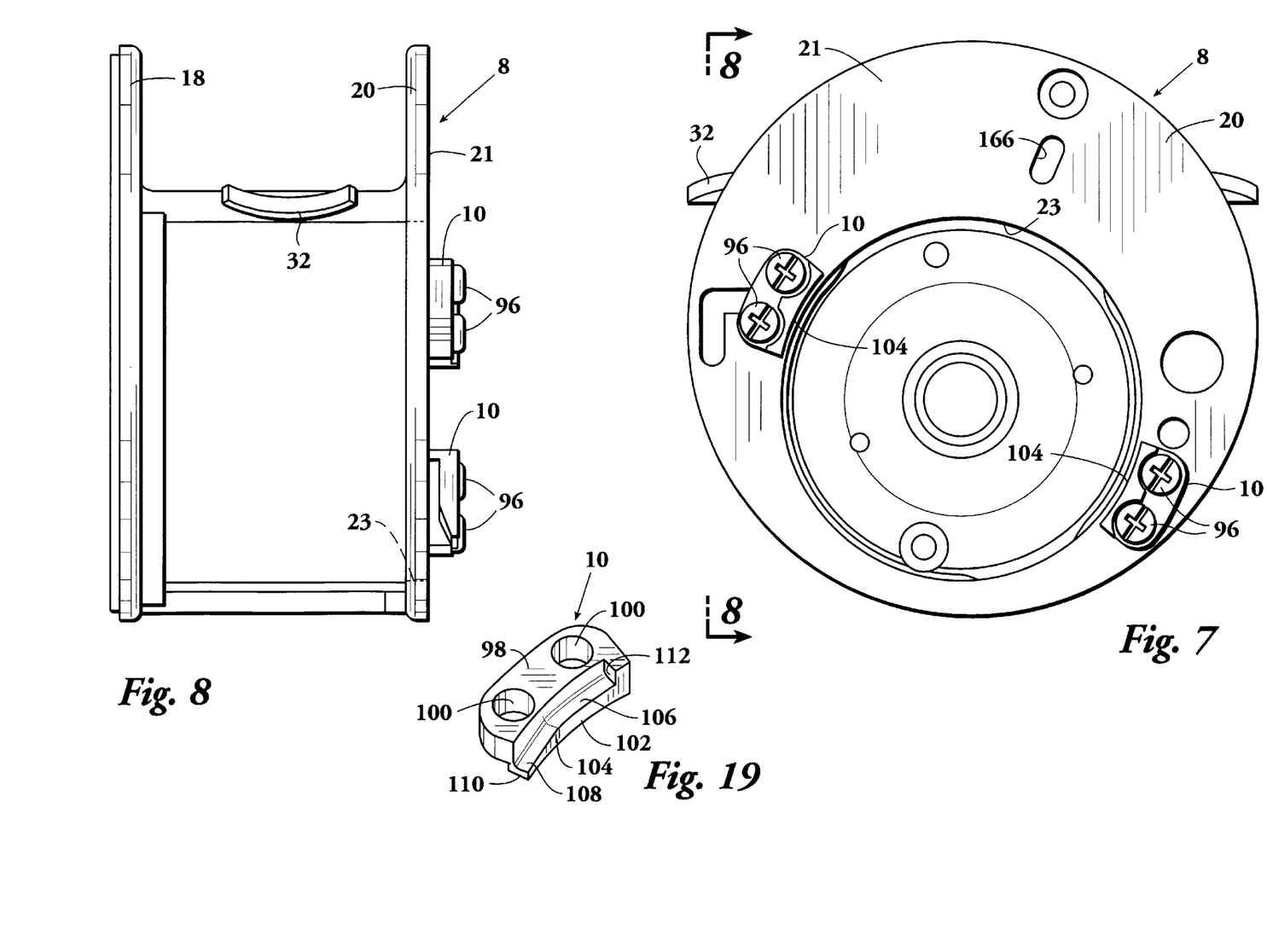
FIG. 7 provides an elevational forward view of a reel frame 8 used in baitcasting reel 4.
FIG. 8 provides an elevational view of frame 8 as seen from perspective 8—8 shown in FIG. 7.
FIG. 19 provides a perspective view of a flange-retaining member 10 used in inventive apparatus 2.
Figure 13:
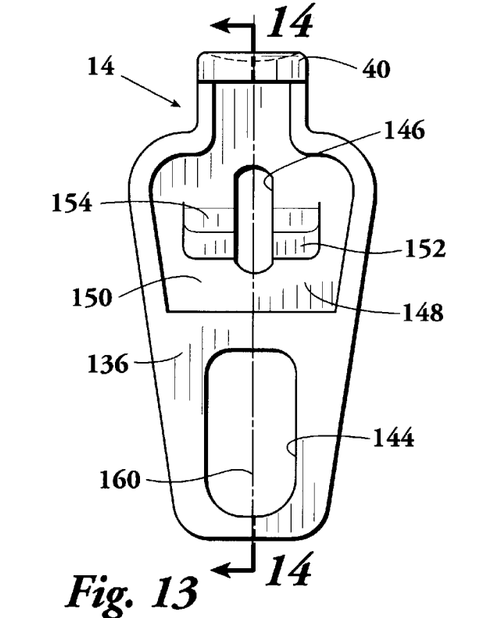
FIG. 13 provides an elevational forward view of an actuating member 14 used in inventive apparatus 2.

At least two flange retaining members 10 are secured by bolts 96 to the exterior surface 21 of frame plate 20. Flange retaining members 10 receive and retain exterior flange 52 of spool-retaining piece 46 such that retaining piece 46 and left cover 34 are snugly held on frame 8. Flange retaining members 10 are positioned adjacent the spool aperture 23 provided in plate 20 whereby, when left cover 34 is secured to frame 8, spool bearing 68 is properly aligned with spool shaft 24 and adjustable brake ring 76 is properly aligned with brake pad housing 72.

Each of flange retaining members 10 preferably includes a body portion 98 having a pair of apertures 100 extending therethrough for receiving bolts 96. Each retaining member 10 also comprises a retaining lip 102 projecting from body portion 98. Each retaining lip 102 includes a side edge 104 having a radius of curvature corresponding to that of the outer wall 50 of spool retainer 46. Retaining lip 102 further comprises: a substantially flat lip portion 106 spaced apart from, and substantially parallel to, the exterior surface 21 of end plate 20; an initial, inclined lip portion 108 extending from the leading end 110 of lip 102 to the substantially flat portion 106 of lip 102; and a stop 112 provided at the trailing end of lip 102. Inclined lip portion 108 slopes downwardly toward substantially flat lip portion 106 such that the gap at leading edge 110 between lip 102 and plate surface 21 is greater than the gap between plate surface 21 and substantially flat lip portion 106.

Flange retaining members 10 are spaced around plate aperture 23 such that, when spool-retaining piece 46 and cover 34 are placed against frame plate 20, retaining members 10 are received through the notches 56 provided in retainer flange 52. Upon placing retaining members 10 in flange notches 56 and rotating cover 34 clockwise with respect to frame 16, notch edges 57 of retainer flange 52 are received under the leading ends 110 of retaining lips 102. As the clockwise rotation of cover 34 continues, the sliding engagement of notch edges 57 with the inclined initial portions 108 of lips 102 pulls flange 52 and cover 34 toward frame plate surface 21. As a result, when flange 52 is eventually received under substantially flat lip portion 106, cover 34 is snugly held against frame plate 20. The clockwise rotation of cover 34 is halted by the eventual abutment of notch edges 57 with the stops 112 provided in lips 102.

As seen in FIGS. 9–12, the locking post 12 used in inventive apparatus 2 preferably comprises: a circular center plate 114 positioned radially about a longitudinal axis 116 and having a forwardly facing surface 118 and a rearwardly facing surface 120; a substantially cylindrical, longitudinal retaining stud 122 projecting from forward surface 118; a longitudinal locking pin 124 projecting from rearward surface 120; and a pair of radial ridges (lateral structures) 126 projecting from rearward surface 120 on opposite sides of locking pin 124. Although various shapes can be used, locking pin 124 is preferably a substantially cylindrical member having a pair of longitudinal beveled surfaces 127 which are perpendicular to operating ridges 126.

As depicted in FIGS. 13–18, actuating member 14 preferably comprises an elongate actuator plate 130 having: an inward longitudinal end 132; an outward longitudinal end 134; a planar forward side 136; and a tiered, rearward side 138. As defined by tiered side 138, actuator plate 130 has an inward longitudinal segment 140 and an outward longitudinal segment 142. A first longitudinal slot 144, sized for receiving cover boss 62 therethrough, is provided in inward longitudinal segment 140. A second elongate slot 146, sized for receiving locking pin 124 therethrough, is provided in outward longitudinal segment 142. Actuating button 40 is formed on outward longitudinal end 134 of actuator plate 130.

Figure 14:
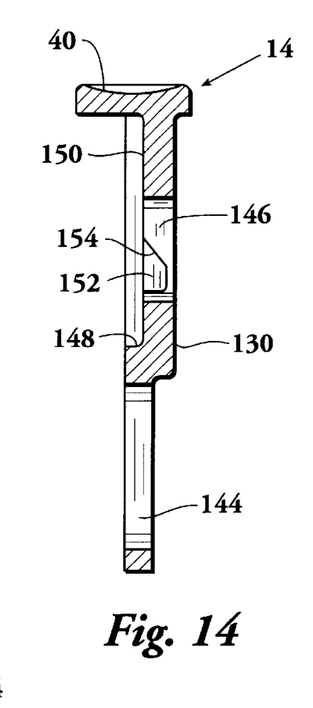
FIG. 14 provides a cutaway, elevational view of actuating member 14 as seen from perspective 14—14 shown in FIG. 13.
Figure 15:
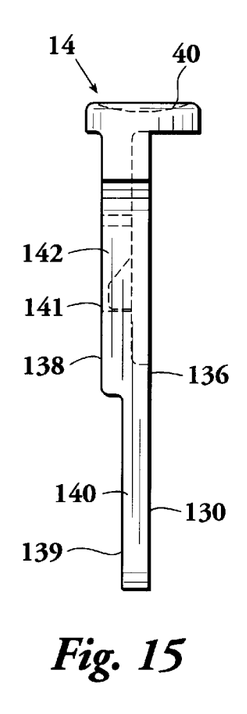
FIG. 15 provides an elevational side view of actuating member 14.
Figure 16:
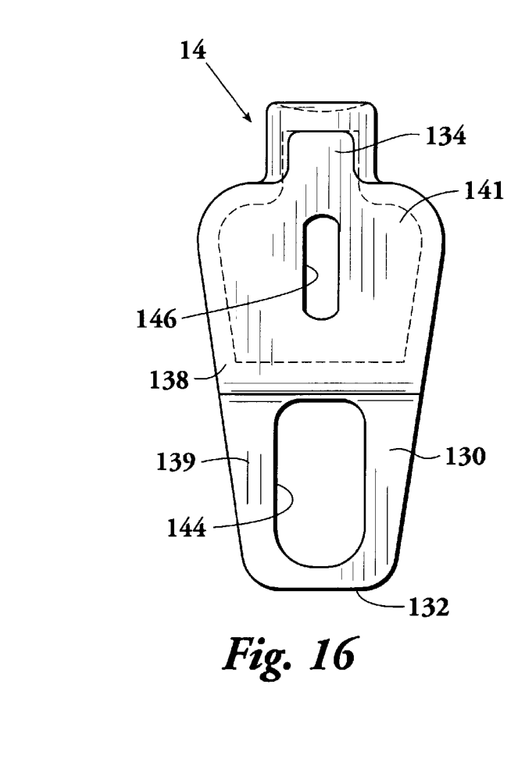
FIG. 16 provides an elevational rearward view of actuating member 14.
Figure 17:
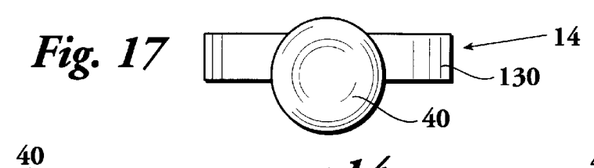
FIG. 17 provides an elevational outward end view of actuating member 14.
Figure 18:
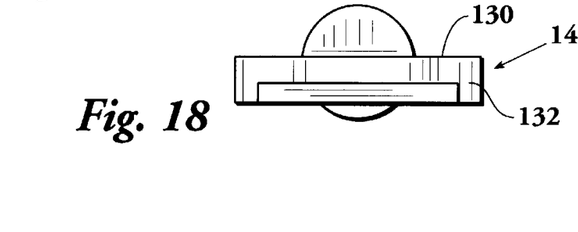
FIG. 18 provides an elevational inward end view of actuating member 14.

A depression 148 is formed in forward side 136 of actuator plate 130. Depression 148 is provided in the outward longitudinal segment 142 of plate 130 and is sized for receiving locking post center plate 114. Depression 148 has a flat interior surface 150 which is substantially parallel to the planar, forward side 136 of plate 130. A lateral groove 152 is formed in interior surface 150 for receiving locking post ridges 126. Lateral groove 152 includes an inclined back wall 154 which interacts with ridges 126 for operating locking post 12. As seen in FIG. 14, elongate slot 146 extends through, and is perpendicular to, lateral groove 152.

Actuating member 14 is slidably secured in cover 34 to allow reciprocating movement of button 40 and actuator plate 130. Actuating member 14 is preferably reciprocatably secured between a support boss 156 formed in cover 34 and spool retainer 46 such that: the planar forward side 136 of actuator plate 130 contacts and slides against the substantially flat end surface 158 of boss 156; first tier surface 139 of actuator plate 130 contacts and slides against the forward surface 143 of retaining plate 48; and second tier surface 141 of actuator plate 130 contacts and slides against the forward surface 145 of spool retainer radial ear 54. The width of elongate slot 144 provided in actuator plate 130 is preferably only slightly greater than the diameter of the cover boss 62 such that boss 62 guides the reciprocating movement of actuating member 14 along a straight line 160. Line 160 corresponds to the longitudinal center line of the forward side 136 of actuator plate 130.

Thus, boss 62, supporting boss 156, retaining plate 148, and spool retainer radial ear 54 retain and guide actuating member 14 such that actuating member 14 is allowed to reciprocate, in a non-rotating manner, in a planar path along line 160.

Locking post 12 is retained in cover 34 for reciprocating movement along longitudinal axis 116. Longitudinal axis 116 is preferably perpendicular to the line of reciprocation 160 of actuating member 14. Longitudinal axis 116 preferably also intersects line 160. Locking post retaining stud 122 is positioned in a pin boss 162 provided in cover 34. Pin boss 162 preferably includes a cylindrical bore 164 in which retaining stud 122 is reciprocatingly received. Locking post 12 is retained in boss 162 by actuating member 14. Preferably, locking post 12 and actuating member 14 are positioned such that (a) locking pin center plate 114 is located between actuator plate 130 and cover 34, (b) locking post ridges 126 are received in the lateral groove 152 of actuator plate 130, and (c) locking pin 124 projects rearwardly through the second elongate slot 146 formed in actuating member 14. The length of second elongate slot 146 is such that locking pin 124 does not interfere with the necessary reciprocating movement of actuating member 14.

Locking pin 124 also extends through an aperture 170 formed in spool retainer ear 54. Aperture 170 is sized for guiding the reciprocating movement of locking post 12 along line 116.

Various types of retaining structures could be provided on or in frame plate 20 for receiving locking pin 124. Preferably, a slot 166 is provided in the exterior surface 21 of frame plate 20 for receiving locking pin 124 and thereby locking cover 34 in fixed position on frame 8. Slot 166 is located in plate 20 such that locking pin 124 is received in slot 166 when the notch edges 57 of spool retainer flange 52 abut the stops 112 provided in flange retaining lips 102. Locking post 12 is preferably aligned such that, when locking pin 124 is received in slot 166, locking post axis 116 is at least substantially perpendicular to the exterior surface 21 of plate 20.

Spring 44 is positioned around pin boss 162 between cover 34 and locking post center plate 114. Spring 44 holds locking post ridges 126 in actuator groove 152 and biases locking pin 124 toward engagement with frame slot 166.

Locking pin 124 can be easily removed from frame slot 166 by pressing actuating button 40. When button 40 is pressed, actuating member 14 moves inwardly along line 160. As actuating member 14 moves linearly inward, the inclined back wall 154 of actuator groove 152 slides across locking post ridges 126 and thereby pushes locking post 12 forwardly along axis 116 away from frame slot 166. When actuating button 40 is released, spring 44 operates to return button 14 to its do original position by urging locking post ridges 126 against the inclined back wall 154 of lateral groove 152 and thereby pushing actuating member 14 outward along line 160.

When actuating button 40 is operated to retract locking pin 124 from frame slot 166, cover 34 can then be easily removed from frame plate 20 by rotating cover 34 a few degrees with respect to frame 8 such that spool retainer flange 52 is removed from retaining lips 102.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus for removably securing a cover on a fishing reel, said apparatus comprising:
   a locking member having a locking pin, said locking member being retained in said cover for reciprocating movement along a line of reciprocation;
   receiving means for receiving said locking pin to thereby secure said cover on said fishing reel; and
   actuating means, operable from outside of said cover, for moving said locking member along said line of reciprocation to remove said locking pin from said receiving means;
   wherein said fishing reel comprises a frame having a frame plate and, when said locking pin is received by said receiving means, said cover is thereby secured over said frame plate; and
   wherein, when said cover is secured over said frame plate, said line of reciprocation is substantially perpendicular to said frame plate.

2. The apparatus of claim 1 wherein said receiving means is provided in said frame plate.

3. The apparatus of claim 1 wherein said receiving means is an aperture provided in said frame plate.

4. The apparatus of claim 1 wherein said actuating means comprises an operating button extending from said actuating body through an aperture provided in said cover.

5. The apparatus of claim 1 wherein:
   said locking member further comprises a retaining stud and
   said apparatus further comprises holding means, provided in said cover, for holding said retaining stud such that said retaining stud is allowed to reciprocate in said holding means along said line of reciprocation.

6. The apparatus of claim 5 wherein said holding means comprises a boss formed in said cover, said boss having a cavity provided therein in which said retaining post is reciprocatingly received.

7. The apparatus of claim 1 further comprising:
   a biasing structure provided on said locking member and
   a spring positioned between said cover and said biasing structure such that said spring biases said locking member along said line of reciprocation toward engagement of said locking pin within said receiving means.

8. An apparatus for removably securing a cover on a fishing reel, said apparatus comprising:
   a locking member having a locking pin, said locking member being retained in said cover for reciprocating movement along a line of reciprocation;
   receiving means for receiving said locking pin to thereby secure said cover on said fishing reel; and
   actuating means, operable from outside of said cover, for moving said locking member along said line of reciprocation to remove said locking pin from said receiving means, said actuating means comprising an actuating body retained in said cover for reciprocating movement along an actuating line, said actuating line being substantially perpendicular to said line of reciprocation.

9. The apparatus of claim 8 wherein:
   said locking member further comprises a radial structure substantially perpendicular to said line of reciprocation and
   said actuating means is operable for exerting an actuating force on said radial structure to move said locking member along said line of reciprocation.

10. The apparatus of claim 8 wherein:
   said locking member further comprises a lateral structure substantially perpendicular to said line of reciprocation;
   said actuating body has a groove formed therein in which said lateral structure is received;
   said groove has an inclined wall; and
   when said actuating means is operated for removing said locking pin from said receiving means, said inclined wall slidably engages said lateral structure and causes said locking member to move along said line of reciprocation.

11. The apparatus of claim 8 wherein said actuating body includes a slot through which said locking pin extends such that said locking pin does not prevent said reciprocating movement of said actuating body.

12. The apparatus of claim 8 wherein said actuating body includes a slot through which a guiding member is received for guiding said reciprocating movement of said actuating body along said actuating line.

13. The apparatus of claim 12 wherein said guiding member is a boss projecting from said cover.

* * * * *